United States Patent
Iwashita et al.

(10) Patent No.: US 8,415,906 B2
(45) Date of Patent: Apr. 9, 2013

(54) MOTOR DRIVING APPARATUS

(75) Inventors: Yasusuke Iwashita, Minamitsuru-gun (JP); Masakazu Niwa, Minamitsuru-gun (JP); Takashi Harada, Minamitsuru-gun (JP); Koujirou Sakai, Minamitsuru-gun (JP); Shinichi Horikoshi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 49 days.

(21) Appl. No.: 13/215,499

(22) Filed: Aug. 23, 2011

(65) Prior Publication Data

US 2012/0068636 A1    Mar. 22, 2012

(30) Foreign Application Priority Data

Sep. 16, 2010  (JP) .................................. 2010-208091
Jul. 5, 2011   (JP) .................................. 2011-149174

(51) Int. Cl.
  *H02P 3/14*  (2006.01)
  *H02P 3/18*  (2006.01)
(52) U.S. Cl.
  USPC ........................ 318/376; 318/400.3; 363/15
(58) Field of Classification Search .................. 318/376, 318/400.3; 363/15
  See application file for complete search history.

(56) References Cited

U.S. PATENT DOCUMENTS

| 7,135,835 B2* | 11/2006 | Yamada et al. ............... 318/800 |
| 2004/0245951 A1 | 12/2004 | Yamada et al. |
| 2010/0192788 A1* | 8/2010 | Tanaka et al. ................. 100/214 |

FOREIGN PATENT DOCUMENTS

| JP | 5-184177 A | 7/1993 |
| JP | 07-245957 | 9/1995 |
| JP | 10-304668 | 11/1998 |
| JP | 11-075328 | 3/1999 |
| JP | 2000-236679 | 8/2000 |
| JP | 2004-364462 | 12/2004 |
| JP | 2005-145687 A | 6/2005 |
| JP | 2006-238515 A | 9/2006 |
| JP | 2006-238520 | 9/2006 |
| JP | 2008-228439 A | 9/2008 |
| JP | 2009-213290 A | 9/2009 |

* cited by examiner

*Primary Examiner* — Bentsu Ro
*Assistant Examiner* — Bickey Dhakal
(74) *Attorney, Agent, or Firm* — Drinker Biddle & Reath LLP

(57) ABSTRACT

When the output of motor reaches or exceeds a predetermined value during acceleration of the motor, the control target value of the DC link voltage which is the voltage of a power storage device is gradually lowered in corresponding relationship to the motor output. When the motor enters a constant speed control mode, the DC link control target value is maintained at a constant level. When the motor enters a deceleration control mode, the DC link control target value is gradually raised in corresponding relationship to the motor output, and regenerative power is recovered by the power storage device and reused in the next control cycle.

8 Claims, 11 Drawing Sheets

MOTOR DRIVING APPARATUS

RELATED APPLICATION DATA

This application claims priority under 35 U.S.C. §119 and/or §365 to Japanese Application No. 2010-208091 filed Sep. 16, 2010 and Japanese Application No. 2011-149174 filed Jul. 5, 2011, the entire contents of both of which are incorporated herein by reference.

BACKGROUND OF THE INVENTION

1. Field of the Invention

The present invention relates to a motor driving apparatus that uses a power storage device in order to reduce the capacity of a power supply system.

2. Description of the Related Art

In a motor driving apparatus for driving a machine tool, industrial machine, robot, or the like, a PWM converter which can control its DC link voltage to a desired voltage higher than the peak value of the input voltage, at near unity power factor through PWM switching operation of power semiconductor devices, is widely used as a converter for converting the input AC power to DC power.

Japanese Unexamined Patent Publication No. 2000-236679 discloses a technique in which a power storage device is connected to the output of a PWM converter and the PWM converter is operated so as to limit the input current, with provisions made to use the power storage device as a buffer to provide motor driving power, thereby suppressing peaks in the power supplied from the power supply during motor acceleration and also suppressing peaks in the regenerative power flowing back to the power supply during motor deceleration.

According to this technique, the power peaks are suppressed by the buffering capability of the power storage device. However, since control is performed so that the voltage of the power storage device is maintained constant at all times, the regenerative power that occurs during motor deceleration is returned to the power supply or, if this is not possible, the regenerative power ends up being consumed by resistors and is not stored in the power storage device for reuse. Accordingly, with this technique, the total amount of power that has to be supplied from the power supply during motor acceleration and constant speed operation does not become smaller than when the power storage device was not used. There is therefore the problem that the above technique does not contribute to significantly easing the requirements on the power supply capacity.

SUMMARY OF THE INVENTION

In a motor driving apparatus using a power storage device, it is an object of the present invention to further ease the requirements on the power supply capacity by reducing not only power peak values but also the total amount of power that has to be supplied from the power supply.

According to the present invention, there is provided a motor driving apparatus including: a PWM converter which, under PWM (Pulse Width Modulation) control, converts AC power supplied from a power source into DC power and vice versa; a PWM inverter which converts the DC power output from the PWM converter into variable-frequency AC power and vice versa, and which drives a motor with the variable-frequency AC power; a power storage device, provided between the PWM converter and the PWM inverter, that can store electric power in an amount capable of driving the motor; and a PWM converter control circuit which operates the PWM converter under PWM control, and wherein: the PWM converter control circuit performs PWM control such that power less than the power required by the motor during an acceleration control period of the motor is supplied from the PWM converter and any deficit in power required to drive the motor is supplied from the power storage device, thereby causing the voltage of the power storage device at the start of a deceleration control period of the motor to decrease and thus allowing at least a portion of regenerative power occurring in the motor during the deceleration control period to be recovered by the power storage device.

BRIEF DESCRIPTION OF THE DRAWINGS

These and other features and advantages of the present invention will be better understood by reading the following detailed description, taken together with the drawings wherein.

DETAILED DESCRIPTION

Figure 1:
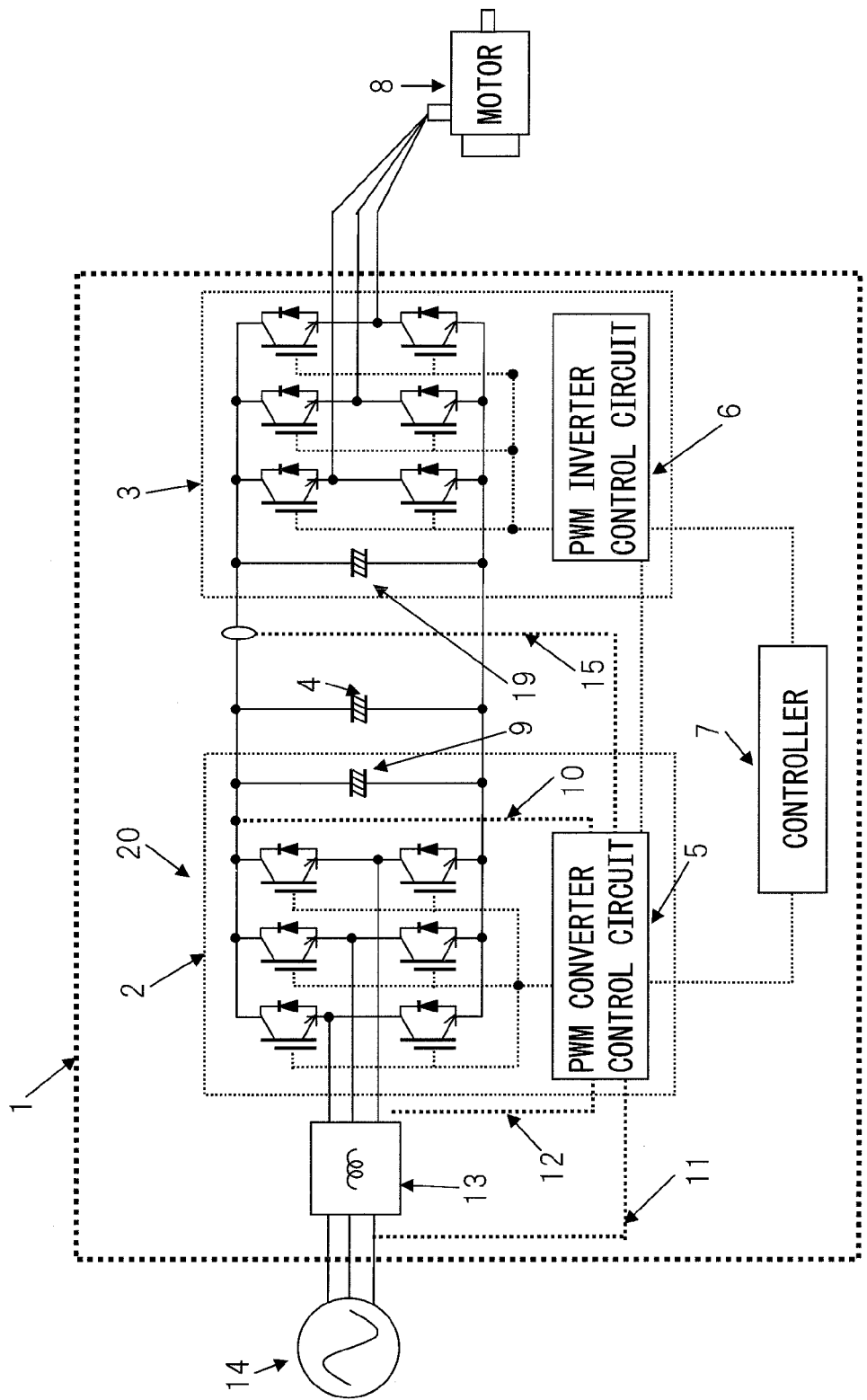
FIG. 1 is a block diagram showing one configuration example of a motor driving apparatus to which the present invention is applied.

FIG. 1 is a block diagram showing one configuration example of a motor driving apparatus 1 to which the present invention is applied. In FIG. 1, the motor driving apparatus 1 includes: a PWM converter 2 which converts three-phase AC power, supplied from a power source 14 via an AC reactor 13, into DC power and vice versa; a PWM inverter 3 which converts the DC power into variable-frequency three-phase AC power and vice versa, and which drives a motor 8 with the variable-frequency three-phase AC power; and a power storage device 4, provided between the PWM converter 2 and the PWM inverter 3, that can store electric power in an amount capable of driving the motor 8. As the power storage device 4, use may be made, for example, an electrolytic capacitor, an electric double layer capacitor, a large-capacity electric power storage device, etc.

The PWM converter 2 includes: a power device array 20 which converts AC to DC by performing three-phase AC boost switching in cooperation with the AC reactor 13; a smoothing capacitor 9 which smoothes the converted DC power; and a PWM converter control circuit 5 which controls the switching operation of the power device array 20. As will be described later, the PWM converter control circuit 5 also has the function of adjusting the control target value of the output voltage of the PWM converter 2. The actual output voltage of the PWM converter 2, and hence the DC link voltage (the voltage of the power storage device 4), varies so as to follow the control target value of the output voltage of the PWM converter 2 as it is adjusted by the PWM converter control circuit 5. The PWM converter control circuit 5 controls the switching operation of the power device array 20 by generating a PWM signal based on an error between the detected value of the DC link voltage (the voltage of the power storage device 4) supplied via a line 10, i.e., the detected value of the output voltage of the PWM converter 2, and its target voltage and based on the detected value of the input voltage supplied via a line 11 and the detected value of the input current supplied via a line 12. In this way, during powering, the three-phase AC power from the power source 14 is converted into DC power of a desired voltage higher than the peak value of the input AC voltage and, during regenerative operation, the regenerative power from the motor 8 is converted into DC power by the inverter 3 and smoothed by a smoothing capacitor 19, and the DC power is converted back to three-phase AC power which is passed back to the power source 14.

The PWM inverter 3 likewise includes a PWM inverter control circuit 6 for controlling the switching operation of its internal power device array. A controller 7 controls the PWM converter control circuit 5 and the PWM inverter control circuit 6 in a consolidated manner.

To charge the power storage device 4 to the peak value of the supply voltage at power on, etc., use may be made of an initial charging circuit internal to the PWM converter 2, or an external charging circuit may be used. After that, the power storage device 4 is charged up to the control target value of the output voltage of the PWM converter 2 under the control of the PWM converter control circuit 5 before the operation starts.

Figure 2:
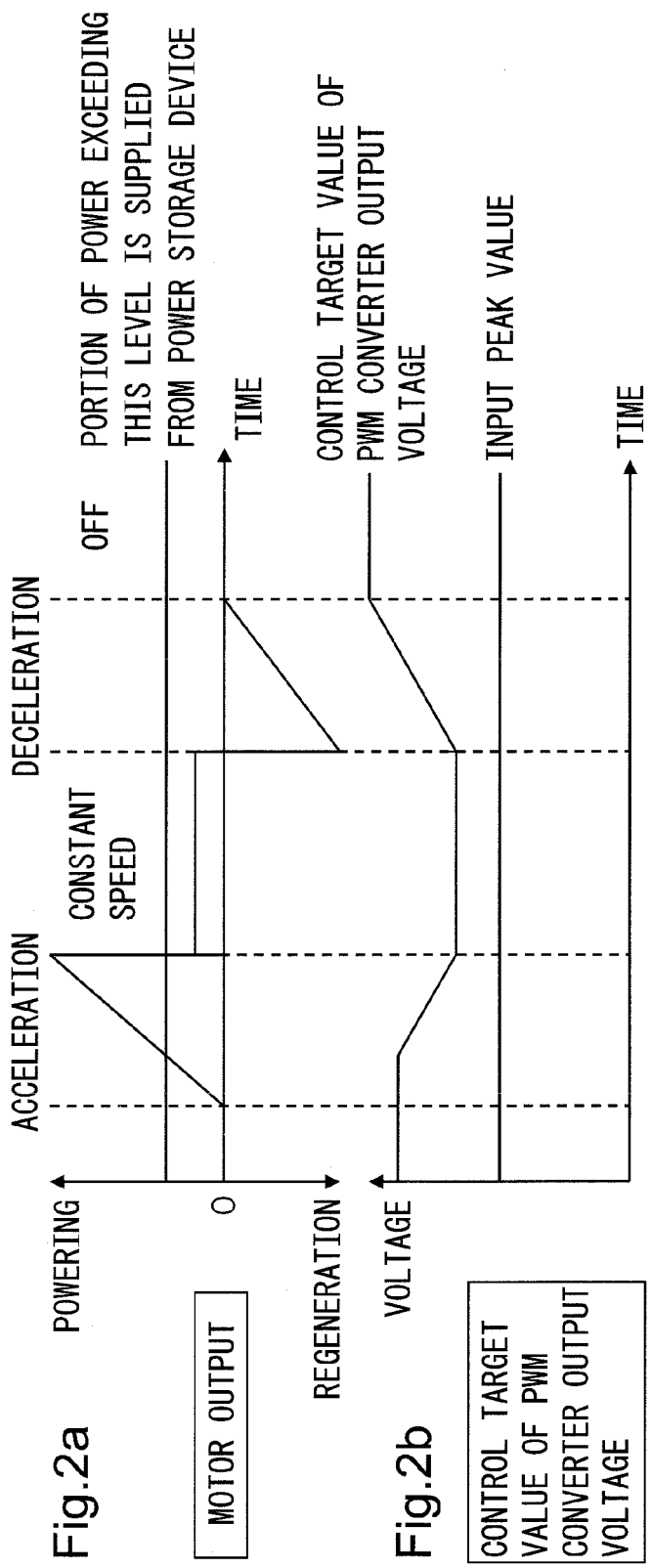
FIGS. 2a and 2b are schematic waveform diagrams for explaining a first embodiment of the present invention.
Figure 3:
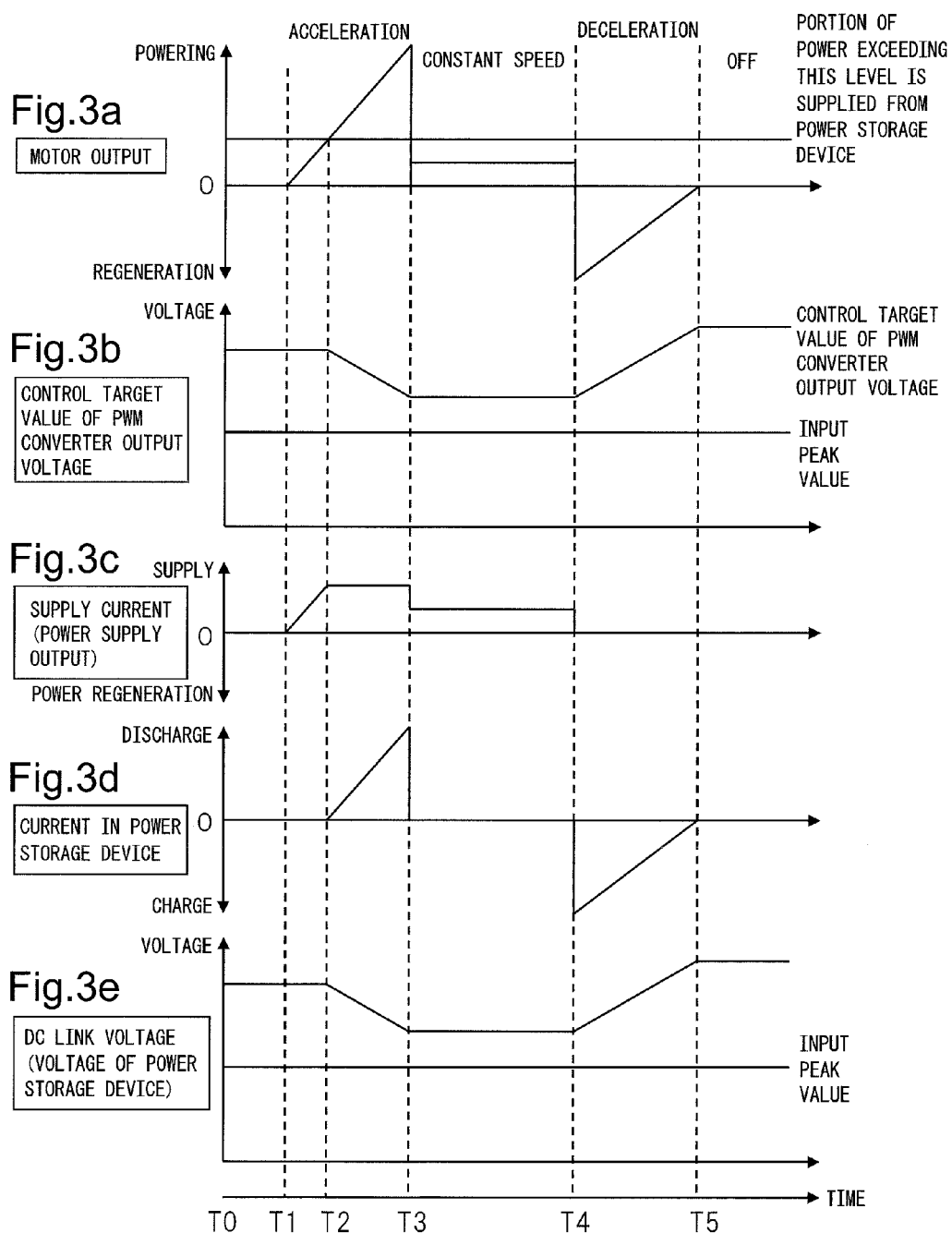
FIGS. 3a to 3e are schematic waveform diagrams for explaining an overview of the control performed in accordance with the first embodiment of the present invention.

FIGS. 2a and 2b are schematic waveform diagrams for explaining the control of the PWM converter according to a first embodiment of the present invention. In FIG. 2a, the motor output corresponds to the power required by the motor 8 or the power recovered from the motor. The motor output value can be obtained from motor output information calculated from the value detected on the input to the PWM inverter 3 and supplied via a line 15, motor output information calculated within the PWM inverter 3, or motor output information calculated within the host controller 7.

During the acceleration control by the controller 7, the PWM converter control circuit 5, upon detecting that the motor output has reached a given value, gradually lowers the control target value of the output voltage of the PWM converter 2, as shown in FIG. 2b, in corresponding relationship to the motor output so that, of the power required by the motor 8 as indicated by the motor output, the portion that exceeds the given value is supplied from the power storage device 4. As the control target value of the output voltage of the PWM converter 2 is gradually lowered, the voltage of the power storage device 4 gradually decreases correspondingly. In this way, the power to be supplied from the power source 14 during the acceleration control is limited to a value lower than the power required by the motor 8, and the deficit in power required to drive the motor 8 is supplied from the power storage device 4. When a constant speed control mode which drives the motor 8 under low-load conditions is entered under the control of the controller 7, the PWM converter control circuit 5 maintains the control target value of the output voltage of the PWM converter 2 at a constant level. As the control target value of the output voltage of the PWM converter 2 is thus maintained at a constant level, the voltage of the power storage device 4 is also maintained at a constant level. As a result, all of the power required to drive the motor 8 is supplied from the power source 14. When a deceleration control mode is entered under the control of the controller 7, the PWM converter control circuit 5 gradually raises the control target value of the output voltage of the PWM converter 2 in corresponding relationship to the regenerative power recovered from the motor 8 as indicted by the motor output shown in FIG. 2a. As the control target value of the output voltage of the PWM converter 2 is gradually raised, the voltage of the power storage device 4 gradually rises correspondingly. In this way, all of the regenerative power from the motor 8 can be recovered by the power storage device 4 for reuse in the next control cycle, while not allowing the power storage device 4 to be charged from the power source 14 and not allowing the regenerative power to pass through to the power source 14.

By the PWM converter control circuit 5 changing the control target value of the output voltage of the PWM converter 2 in corresponding relationship to the motor output, as described above, the amount of power that has to be supplied from the power source 14 during the acceleration of the motor 8 can be reduced, thus serving to ease the requirements on the power supply capacity.

FIGS. 3a to 3e schematically show, by way of example, the waveforms at the various parts according to the present embodiment. In FIGS. 3a to 3e, during the period from T0 to T1, the motor is off, and the PWM converter 2 maintains the DC link voltage (the voltage of the power storage device 4) (see FIG. 3e) at a constant value higher than the peak value of the input voltage. At time T1, acceleration of the motor starts under the control of the controller 7; here, since the PWM converter control circuit 5 maintains the control target value of the output voltage of the PWM converter 2 constant (see FIG. 3b) until the motor output (see FIG. 3a) reaches a predetermined value at time T2, all the power required to drive the motor 8 is supplied from the power source 14, and the DC link voltage (the voltage of the power storage device 4) (see FIG. 3e) does not change. During the period from time T2 to time T3 at which the constant speed control period starts, the PWM converter control circuit 5 gradually lowers the control target value of the output voltage of the PWM converter 2 (see FIG. 3b) in corresponding relationship to the motor output; as a result, the power storage device 4 is discharged, and the voltage of the power storage device 4 thus decreases (see FIG. 3e). At this time, the power from the power storage device 4 compensates for the power from the power source 14, and the current from the power source 14 (power supply output, see FIG. 3c) is maintained at a constant level. During the constant speed control period from T3 to T4, since the PWM converter control circuit 5 maintains the control target value of the output voltage of the PWM converter 2 constant (see FIG. 3b), the power that matches the motor output is supplied from the power source 14. When the deceleration control starts at time T4 under the control of the controller 7, the PWM converter control circuit 5 raises the control target value of the output voltage of the PWM converter 2 (see FIG. 3b) in corresponding relationship to the motor output, and the regenerative power from the motor 8 is recovered by the power storage device 4. In this way, since the control target value of the output voltage of the PWM converter 2 rises under the control of the PWM converter control circuit 5 as the regenerative power is generated, the amount of regenerative power flowing back to the power source 14 is virtually reduced to zero, and the power storage device 4 is not charged from the power source 14.

If the amount of regenerative power during the deceleration control is larger than expected, giving rise to the possibility that the control target value of the output voltage of the PWM converter 2 may become too high, the PWM converter control circuit 5 may stop raising the control target value of the output voltage of the PWM converter 2, for example, upon detecting that the control target value has reached the initial value set before the start of the operation, and may thereafter maintain that value by performing PWM control so that any regenerative power generated thereafter flows back to the power source 14.

Conversely, if the amount of regenerative power is not sufficient, and the control target value of the output voltage of the PWM converter 2 at the end of the deceleration control falls short of the initial value set before the start of the operation, the PWM converter control circuit 5 may perform PWM control so that the control target value of the output voltage of the PWM converter 2 is gradually raised, for example, during the operation off period of the PWM converter control circuit 5, until the control target value reaches the initial value.

In such cases, it is preferable that, considering the capability of the power source 14 used, the PWM converter control circuit 5 adjusts the "gradient" which defines the time rate of change of the control target value of the output voltage of the PWM converter 2. Further, the regenerative current to flow back to the power source 14 and the current to be supplied from the power source 14 may be limited by using the input current limiting function to be described later.

Figure 4:
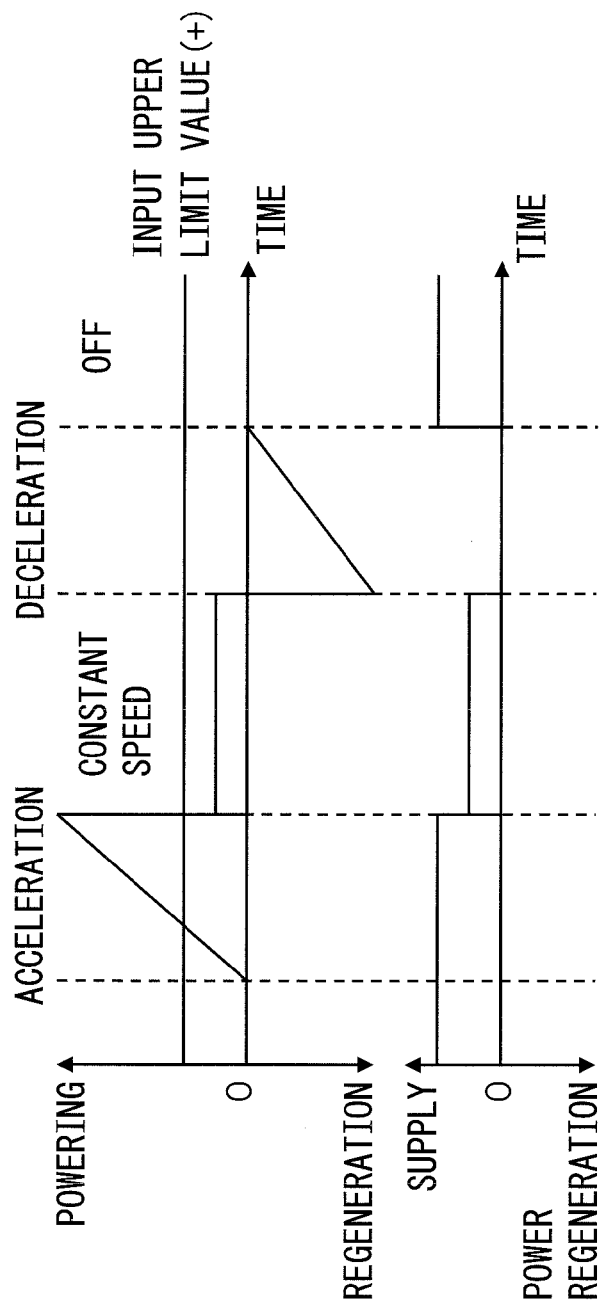
FIGS. 4a and 4b schematic waveform diagrams for explaining an overview of the control performed in accordance with a second embodiment of the present invention.

The PWM converter control circuit 5 of FIG. 1 has a function whereby, when the command value of the input current to the PWM converter 2, determined based on the error between the output voltage of the PWM converter 2 detected via the line 10 and its control target value, exceeds the limit value of the input current, the PWM signal used to control the switching operation of the power device array 20 is generated by using this limit value as the command value of the input current, thereby limiting the input current within a given range irrespectively of the error between the DC link voltage (the voltage of the power storage device 4) and the control target value of the output voltage of the PWM converter 2. As shown in FIGS. 4a and 4b, in a second embodiment of the present invention, the PWM converter control circuit 5 sets an appropriate input current limit value for each of the acceleration control, constant speed control, and deceleration control of the motor 8, to achieve similar results to those obtained in the first embodiment. In FIGS. 4a and 4b, the PWM converter control circuit 5 sets an upper limit on the portion of the power required for the acceleration of the motor 8 that is supplied from the power source 14, and takes the corresponding current value as the upper limit value of the input current for both the motor off and acceleration periods. For the constant speed control of the motor 8, the PWM converter control circuit 5 determines the upper limit value by taking the current value corresponding to the motor output during the constant speed control. For the deceleration control of the motor 8, the PWM converter control circuit 5 sets both the upper and lower limit values of the input current to zero.

Figure 5:
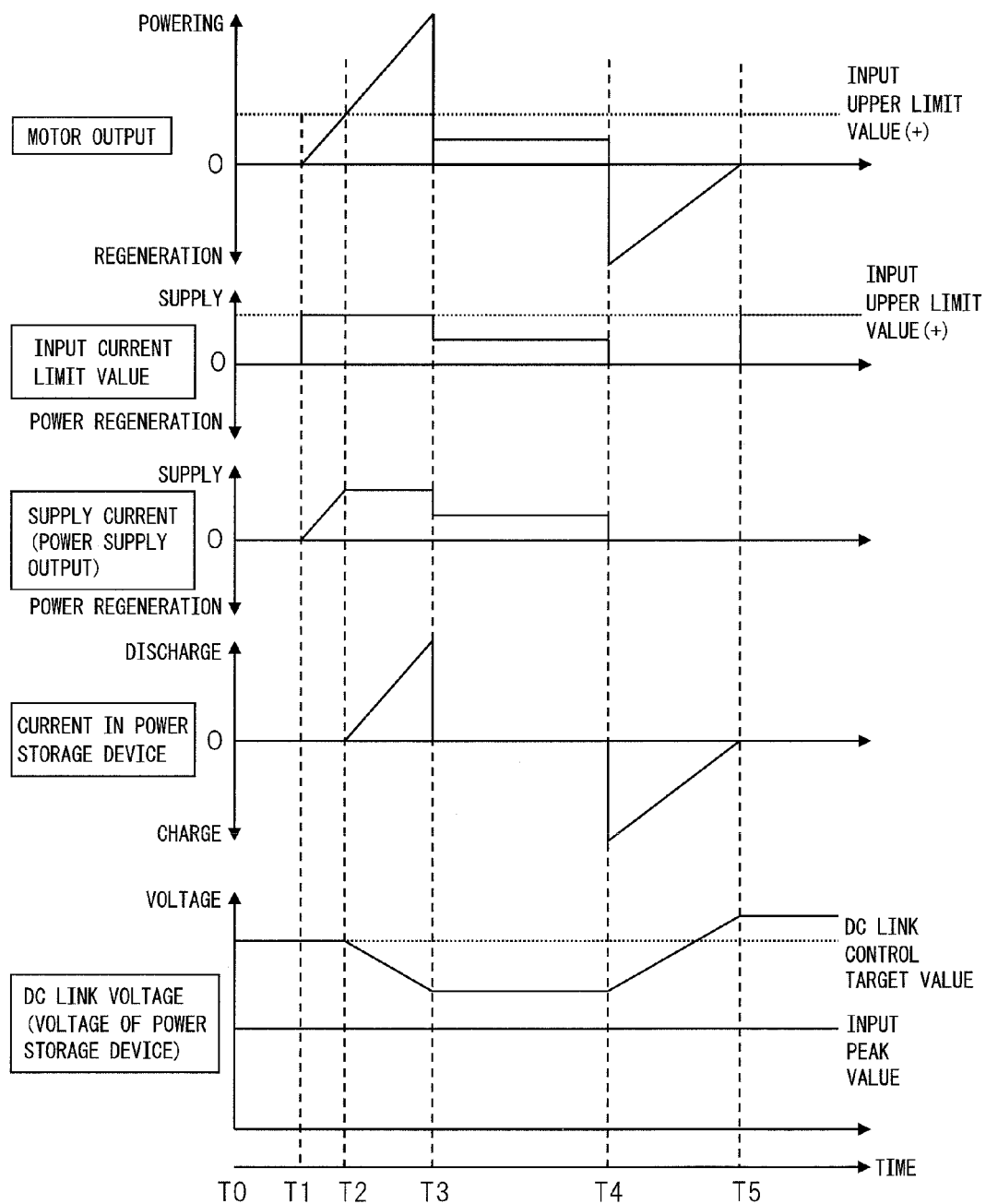
FIG. 5 is a schematic waveform diagram for explaining the second embodiment of the present invention.

FIG. 5 schematically shows, by way of example, the waveforms at the various parts according to the present embodiment. In FIG. 5, during the period from T0 to T1, the motor is off, and the PWM converter control circuit 5 performs PWM control so that the output voltage of the PWM converter 2 follows the control target value which is higher than the peak value of the input voltage. At time T1, acceleration of the motor starts under the control of the controller 7; since the motor output is low, and the supply current is lower than the input current limit value, all the power required to drive the motor 8 is supplied from the power source 14 until time T2. During the period from T2 to T3, since the input current is limited to its upper limit value, the deficit in power required to drive the motor 8 is supplied from the power storage device 4, so that the DC link voltage (the voltage of the power storage device 4) gradually decreases. During the constant speed control period from T3 to T4, since the PWM converter control circuit 5 sets the input power limit value at the value corresponding to the motor output, power to the motor 8 is supplied only from the power source 14, and the power storage device 4 is neither charged nor discharged, so that the DC link voltage (the voltage of the power storage device 4) is maintained constant. When the deceleration control period starts at time T4, since the PWM converter control circuit 5 sets both the upper and lower limit values of the input current to zero, all of the regenerative power is recovered by the power storage device 4, and the DC link voltage (the voltage of the power storage device 4) rises.

In the second embodiment also, there can occur cases where the amount of regenerative power is larger than expected, giving rise to the possibility that the DC link voltage (the voltage of the power storage device 4) may become too high. In such cases, even during the deceleration control period of the motor 8, for example, the PWM converter control circuit 5 may change the input current limit value to the same value as that for the motor off period upon detecting that the DC link voltage (the voltage of the power storage device 4) has reached the control target value of the output voltage of the PWM converter 2, and may perform PWM control so that the regenerative power flows back to the power source 14.

The input current limit value for the acceleration control of the motor 8 can be set, for example, by a setting switch for the PWM converter control circuit 5, or by a parameter for the host controller 7 of the PWM converter control circuit 5, in accordance with such factors as the capacity of the power supply system where the motor driving apparatus 1 is installed, the output pattern of the motor, and the capacity of the power storage device. For example, the input current limit value may be set by converting the power allowable in the power supply system into a current value or by converting wattage equal to one half of the maximum output of the motor operation into a current value. The input current limit value is determined by also considering the capacity of the power storage device 4 so that the DC link voltage (the voltage of the power storage device 4) does not drop to the peak value of the input voltage. Instead of limiting the input current, the input power may be limited. The input power is calculated from the detected value of the input voltage to the motor driving apparatus 1, supplied via the line 11, and the detected value of the input current to the PWM converter 2, supplied via the line 12.

Figure 6:
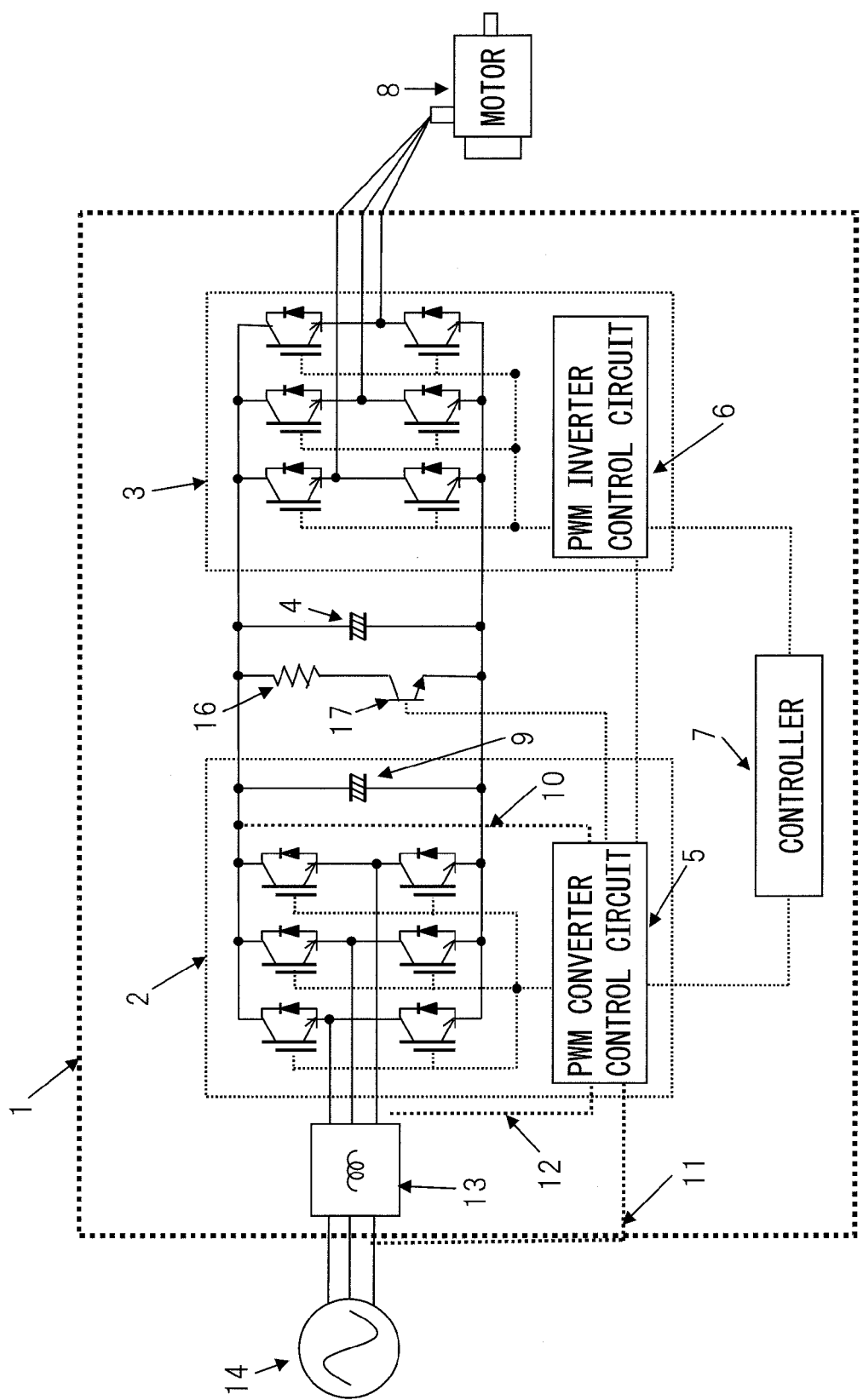
FIG. 6 is a block diagram showing an addition of a resistive discharge unit.

As shown in FIG. 6, a series connection of a resistor 16 and a switch 17 may be provided in parallel with the power storage device 4, with provisions made so that when the DC link voltage (the voltage of the power storage device 4) exceeds a first threshold, the PWM converter control circuit 5 performs control to turn on the switch 17 thereby causing the regenerative power to be consumed by the resistor 16 and, when the DC link voltage (the voltage of the power storage device 4) has decreased to or below a second threshold which is lower than the first threshold, the PWM converter control circuit 5 performs control to turn off the switch 17 which is turned on again if the DC link voltages thereafter rises above the first threshold, the process being repeated during the deceleration control.

Figure 7:
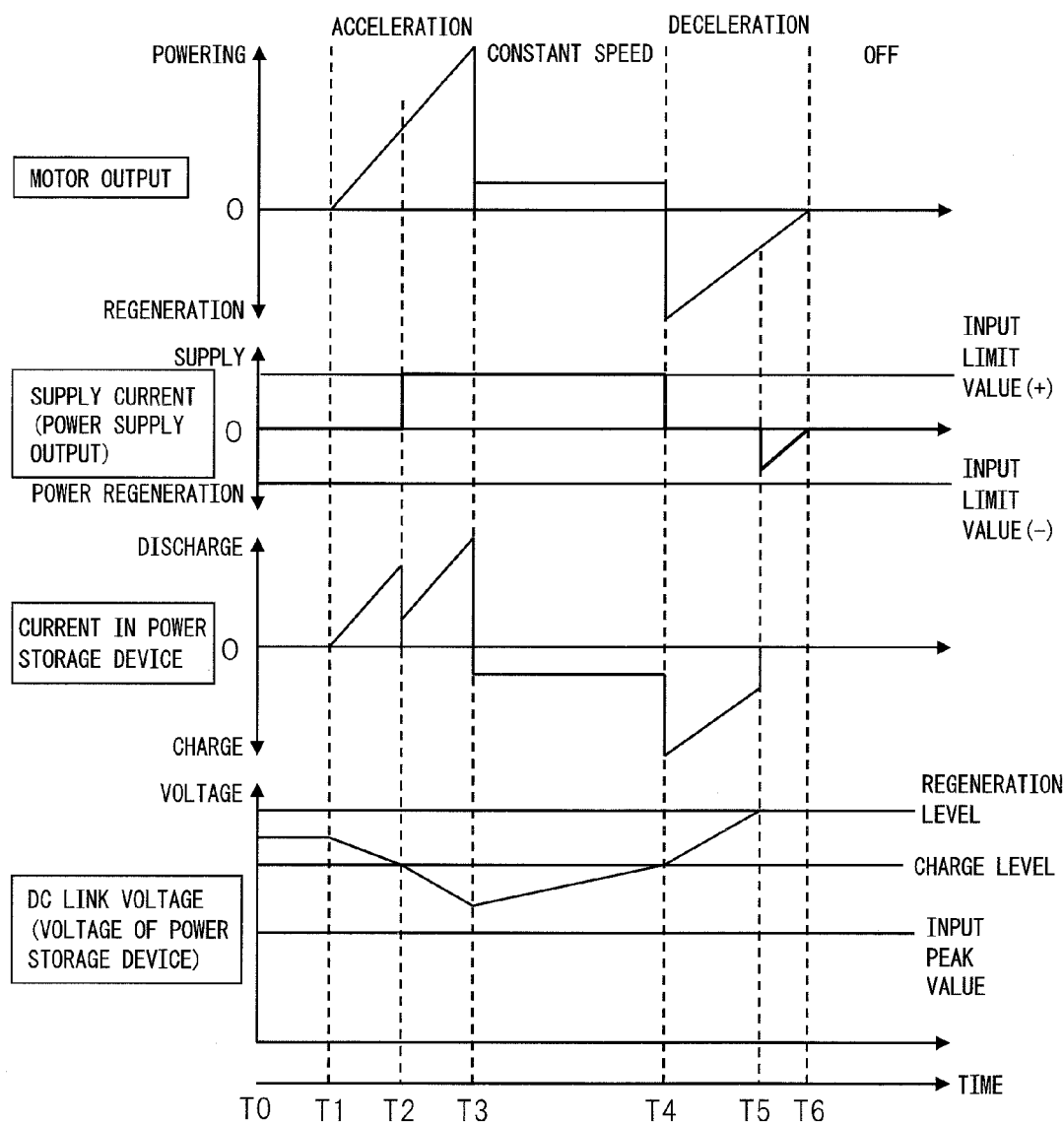
FIG. 7 is a schematic waveform diagram for explaining a third embodiment of the present invention.

FIG. 7 is a schematic waveform diagram for explaining the control of the PWM converter according to a third embodiment of the present invention. In the third embodiment, the power storage device is charged by limiting the current from the power source, only when the voltage of the power storage device has dropped below its charge level, irrespective of the operation state of the motor.

When the acceleration control starts at time T1 under the control of the controller 7 with the upper limit of the supply current (power supply output) set to zero by the PWM converter control circuit 5, power is supplied to the motor 8 only from the power storage device 4. At time T2 when the DC link voltage (the voltage of the power storage device 4) drops to the charge level, the PWM converter control circuit 5 sets this charge level as the control target value of the output voltage of the PWM converter 2, and sets the upper limit value of the input current to a prescribed nonzero value. This upper limit value is higher than the current value required for the constant speed control, but is not higher than the current value required for the acceleration control at this point in time. Accordingly, during the second half of the acceleration control, the deficit in power required to drive the motor 8 is supplied from the power storage device 4, so that the DC link voltage (the voltage of the power storage device 4) further drops.

When the constant speed control starts at time T3, the motor output becomes smaller than the current limit value; therefore, the power storage device 4 starts to be charged by using this difference, and the DC link voltage (the voltage of the power storage device 4) is restored to the charge level by time T4 at which the deceleration control starts. Upon detecting that the DC link voltage (the voltage of the power storage device 4) is restored to the charge level, the PWM converter control circuit 5 sets the upper limit value of the input current to zero.

During the deceleration control which starts at T4 under the control of the controller 7, since the upper and lower limit values of the input current are both set to zero by the PWM converter control circuit 5, there is no charging from the power source 14, nor does the regenerative power flow back to the power source, but all of the regenerative power from the motor 8 is stored in the power storage device 4. When the DC link voltage (the voltage of the power storage device 4) is detected having reached a regeneration level which is higher than the charge level, the PWM converter control circuit 5 may change the lower limit value of the input current so that the regenerative power is allowed to flow back to the power supply.

Figure 8:
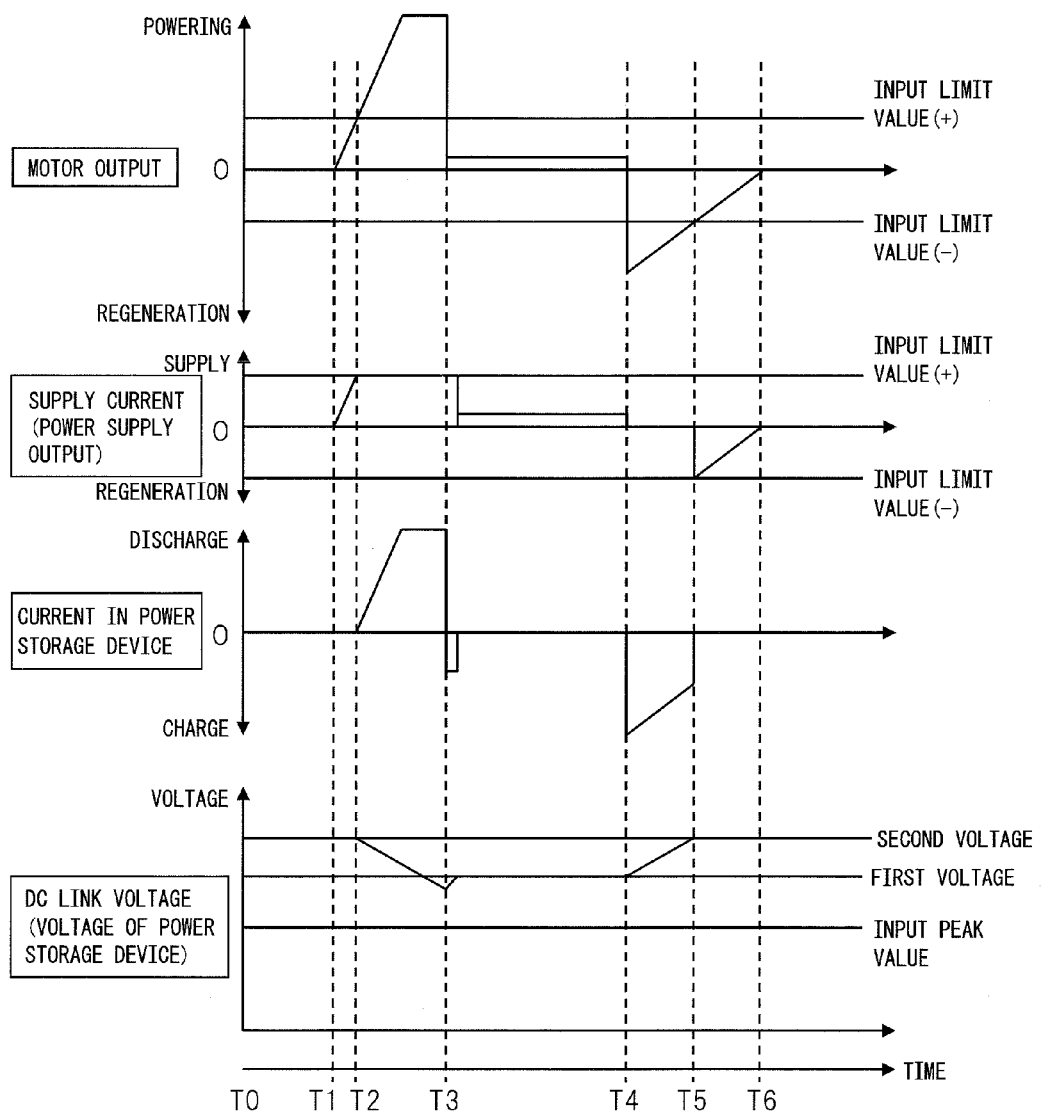
FIG. 8 is a schematic waveform diagram for explaining a fourth embodiment of the present invention.

FIG. 8 is a schematic waveform diagram for explaining the control of the PWM converter according to a fourth embodiment of the present invention. In FIG. 8, during the motor off period from T0 to T1, the PWM converter control circuit 5 controls the output voltage of the PWM converter 2 to a second voltage which is higher than the peak value of the input voltage. During the period from T1 when acceleration of the motor 8 starts under the control of the controller 7 to time T2 when the motor output rises and the supply current (power supply output) reaches the limit value on the positive side, all the power required to drive the motor 8 is supplied from the power source 14. After the supply current (power supply output) has reached the limit value at time T2, the portion of the power that exceeds the limit value is supplied from the power storage device 4, and the DC link voltage (the voltage of the power storage device 4) decreases accordingly. When the DC link voltage (the voltage of the power storage device 4) is detected having dropped to or below a first voltage which is lower than the second voltage, the PWM converter control circuit 5 changes the control target value of the output voltage of the PWM converter 2 to the first value. When the constant speed control starts at time T3 under the control of the controller 7, the PWM converter control circuit 5 changes the control target value of the output voltage of the PWM converter 2 from the second voltage to the first voltage which is lower than the second voltage. Since the current required at this time is less than the limit value, the current from the power source 14 is used to drive the motor 8 as well as to maintain the power storage device 4 at the first voltage. When the deceleration control starts at time T4 under the control of the controller 7, the PWM converter control circuit 5 sets both the upper and lower limit values of the input current to zero; therefore, there is no charging from the power source 14, nor does the regenerative power flow back to the power source 14, but all the regenerative power from the motor 8 is stored in the power storage device 4. Upon detecting that the DC link voltage (the voltage of the power storage device 4) is restored to the second value, the PWM converter control circuit 5 sets the control target value of the output voltage of the PWM converter 2 and the limit value of the input current back to their initial values, and any regenerative power occurring thereafter is allowed to flow back to the power source 14.

Figure 9:
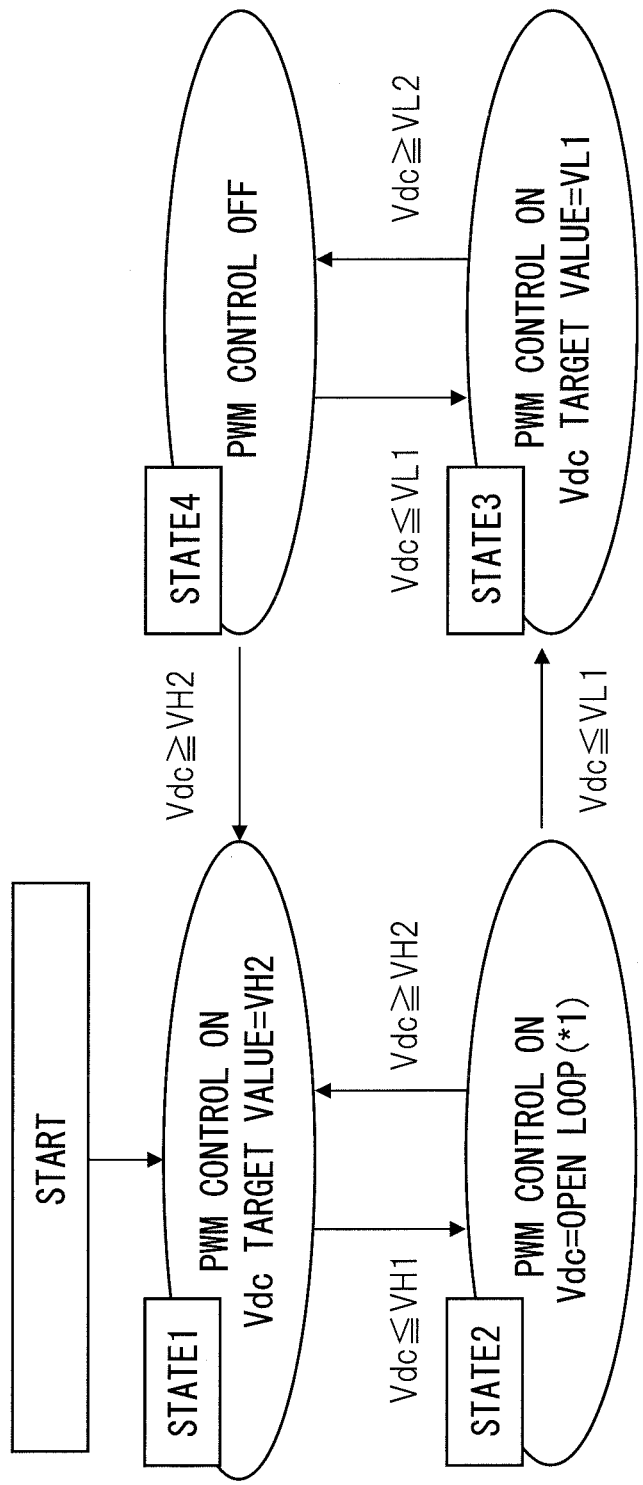
FIG. 9 is a state transition diagram illustrating the control performed in accordance with a fifth embodiment of the present invention.
Figure 10:
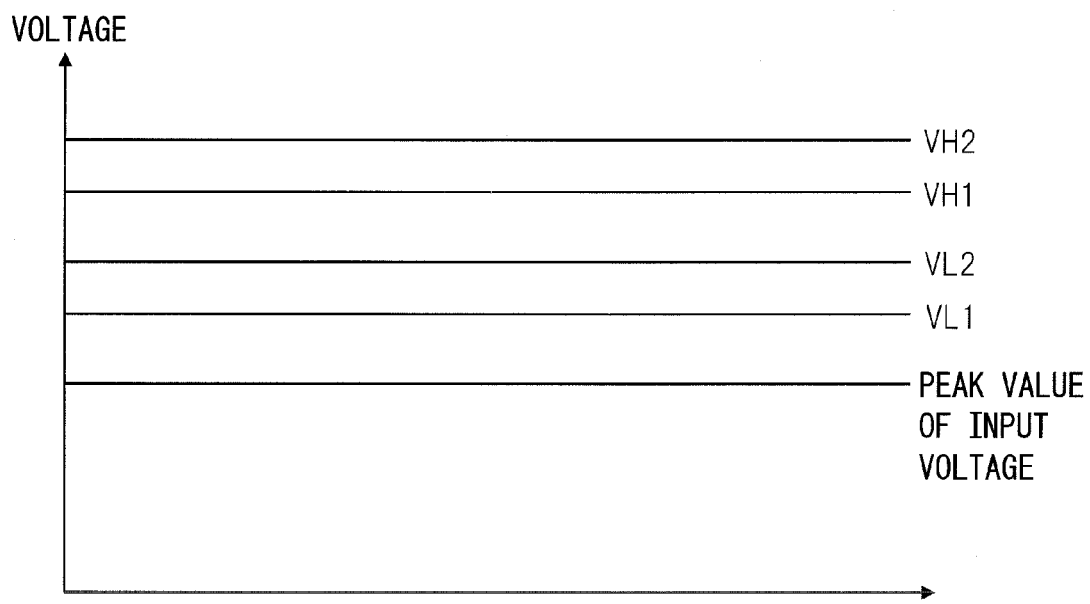
FIG. 10 is a diagram showing a comparison of voltage values used in FIG. 9.
Figure 11:
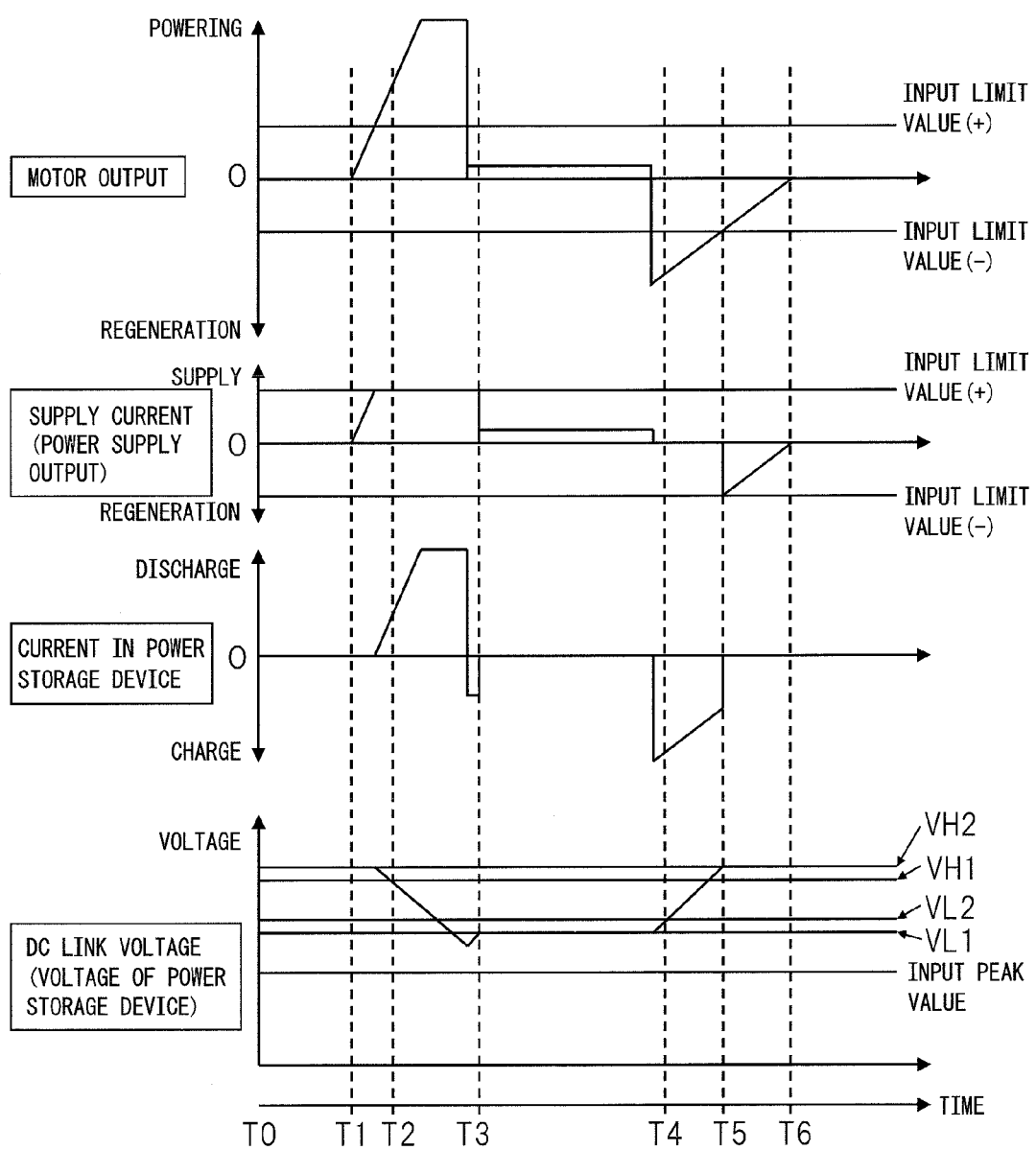
FIG. 11 is a schematic waveform diagram for explaining the fifth embodiment of the present invention.

FIG. 9 is a state transition diagram illustrating the control of the PWM converter according to a fifth embodiment of the present invention. FIG. 10 shows the levels of the voltages VL1, VL2, VH1, and VH2 used in FIG. 9 for comparison with the peak value of the input voltage. FIG. 11 is a schematic waveform diagram for explaining the control.

The control starts from state 1 in FIG. 9 and, during the motor off period from T0 to T1, the PWM converter control circuit 5 controls the DC link voltage (the voltage of the power storage device 4) to VH2. At time T1, the acceleration control of the motor 8 starts under the control of the controller 7; at this time, the motor output is low, and the supply current (power supply output) is less than the limit value, so that all of the power required to drive the motor 8 is supplied from the power source 14. The DC link voltage (the voltage of the power storage device 4) continues to be controlled to VH2. As the motor output increases, and the supply power from the power source 14 reaches the input limit value, the input current is limited; as a result, the deficit in power required to drive the motor 8 is supplied from the power storage device 4, and the DC link voltage (the voltage of the power storage device 4) thus decreases. When the DC link voltage (the voltage of the power storage device 4) drops to or below VH1, a transition is made to state 2. In state 2, since the input current is limited, the control of the DC link voltage (the voltage of the power storage device 4) is an open loop control, and the DC link voltage (the voltage of the power storage device 4) further drops. When the DC link voltage (the voltage of the power storage device 4) drops to or below VL1, control is performed so as to maintain VL1, and the necessary power is supplied from the power source 14. Almost at the same time, the control of the motor 8 transitions to the constant speed control, and the load decreases. When the motor 8 starts to decelerate, and the DC link voltage (the voltage of the power storage device 4) increases to or above VL2, a transition is made to state 4, and the PWM converter control circuit 5 turns off the PWM control. As a result, the power supplied from the power source 14 and the regenerative power flowing back to the power source both decrease to zero, and all the regenerative power generated during the deceleration control is recovered by the power storage device 4. When the DC link voltage (the voltage of the power storage device 4) increases to or above VH2, a transition is made back to state 1, and the PWM converter control circuit 5 resumes the PWM control by setting the control target value of the output voltage of the PWM converter 2 to VH2.

According to the present invention, since the regenerative power occurring in the motor during the deceleration control period is recovered by the power storage device and reused in the next control cycle, there is offered the advantage that the total amount of power that has to be supplied from the power source can be reduced, thus serving to ease the requirements on the power supply capacity.

The invention claimed is:

1. A motor driving apparatus comprising:
   a PWM converter which, under PWM control, converts AC power supplied from a power source into DC power and vice versa;
   a PWM inverter which converts the DC power output from said PWM converter into variable-frequency AC power and vice versa, and which drives a motor with said variable-frequency AC power;
   a power storage device, provided between said PWM converter and said PWM inverter, that can store electric power in an amount capable of driving said motor; and
   a PWM converter control circuit which operates said PWM converter under PWM control, and wherein:
   said PWM converter control circuit causes the voltage of said power storage device to decrease by performing PWM control by gradually lowering a control target value of an output voltage of said PWM converter in corresponding relationship to motor output during the acceleration control period of said motor such that power less than the power required by said motor during an acceleration control period of said motor is supplied from said PWM converter and any deficit in power required to drive said motor is supplied from said power storage device;
   said PWM converter control circuit maintains the voltage of said power storage device by performing PWM control by setting a control target value of an output voltage of said PWM converter to the same value as the voltage at which said power storage device is to be maintained during the constant speed control period of said motor; and
   said PWM converter control circuit performs PWM control by gradually raising a control target value of an output voltage of said PWM converter in corresponding relationship to motor output during the deceleration period of said motor, so that at least a portion of the regenerative power occurring in said motor is recovered by said power storage device whose voltage has decreased, while not allowing said power storage device whose voltage has decreased to be charged from said power source and not allowing said regenerative power to pass through to said power source.

2. A motor driving apparatus comprising:
   a PWM converter which, under PWM control, converts AC power supplied from a power source into DC power and vice versa;
   a PWM inverter which converts the DC power output from said PWM converter into variable-frequency AC power and vice versa, and which drives a motor with said variable-frequency AC power;
   a power storage device, provided between said PWM converter and said PWM inverter, that can store electric power in an amount capable of driving said motor; and
   a PWM converter control circuit which operates said PWM converter under PWM control, and wherein:
   said PWM converter control circuit causes the voltage of said power storage device to decrease by performing PWM control by limiting an input current or input power of said PWM converter to a predetermined level during the acceleration control period of said motor such that power less than the power required by said motor during an acceleration control period of said motor is supplied from said PWM converter and any deficit in power required to drive said motor is supplied from said power storage device;
   said PWM converter control circuit maintains the voltage of said power storage device by performing PWM control by limiting an input current or input power of said PWM converter to a level that matches a motor output level during the constant speed control period of said motor; and
   said PWM converter control circuit performs PWM control by setting an upper limit value and lower limit value of an input current or input power of said PWM converter to zero during the deceleration period of said motor, so that at least a portion of the regenerative power occurring in said motor is recovered by said power storage device whose voltage has decreased, while not allowing said power storage device whose voltage has decreased to be charged from said power source and not allowing said regenerative power to pass through to said power source.

3. A motor driving apparatus comprising:
   a PWM converter which, under PWM control, converts AC power supplied from a power source into DC power and vice versa;
   a PWM inverter which converts the DC power output from said PMW converter into variable-frequency AC power and vice versa, and which drives a motor with said variable-frequency AC power;
   a power storage device, provided between said PWM converter and said PWM inverter, that can store electric power in an amount capable of driving said motor; and
   a PWM converter control circuit with operates said PWM converter under PWM control, and wherein:
   said PWM converter control circuit causes the voltage of said power storage device to decrease by performing PWM control by limiting an input current or input power of said PWM converter to a predetermined level during the acceleration control period of said motor such that power less than the power required by said motor during an acceleration control period of said motor is supplied from said PWM converter and any deficit in power required to drive said motor is supplied from said power storage device;
   said PWM converter control circuit maintains the voltage of said power storage device by performing PWM control by limiting an input current or input power of said PWM converter to a level that matches a motor output level during the constant speed control period of said motor; and
   said PWM converter control circuit performs PWM control by stopping the PWM control of said PWM converter during the deceleration period of said motor, so that at least a portion of the regenerative power occurring in said motor is recovered by said power storage device whose voltage has decreased, while not allowing said power storage device whose voltage has decreased to be charged from said power source and not allowing said regenerative power to pass through to said power source.

4. A motor driving apparatus comprising:
a PWM converter which, under PWM control, converts AC power supplied from a power source into DC power and vice versa;
a PWM inverter which converts the DC power output from said PWM converter into variable-frequency AC power and vice versa, and which drives a motor with said variable-frequency AC power;
a power storage device, provided between said PWM converter and said PWM inverter, that can store electric power in an amount capable of driving said motor; and
a PWM converter control circuit which operates said PWM converter under PWM control, and wherein:
said PWM converter control circuit causes the voltage of said power storage device to decrease by performing PWM control by limiting an input current or input power of said PWM converter to a predetermined level and by gradually lowering a control target value of an output voltage of said PWM converter in corresponding relationship to motor output during the acceleration control period of said motor such that power less than the power required by said motor during an acceleration control period of said motor is supplied from said PWM converter and any deficit in power required to drive said motor is supplied from said power storage device;
said PWM converter control circuit maintains the voltage of said power storage device by performing PWM control by limiting an input current or input power of said PWM converter to a level that matches a motor output level and by setting a control target value of an output voltage of said PWM converter to the same value as the voltage at which said power storage device is to be maintained during the constant speed control period of said motor; and
said PWM converter control circuit performs PWM control by setting an upper limit value and lower limit value of an input current or input power of said PWM converter to zero and by gradually raising a control target value of an output voltage of said PWM converter in corresponding relationship to motor output during the deceleration period of said motor, so that at least a portion of the regenerative power occurring in said motor is recovered by said power storage device whose voltage has decreased, while not allowing said power storage device whose voltage has decreased to be charged from said power source and not allowing said regenerative power to pass through to said power source.

5. A motor driving apparatus comprising:
a PWM converter which, under PWM control, converts AC power supplied from a power source into DC power and vice versa;
a PWM inverter which converts the DC power output from said PWM converter into variable-frequency AC power and vice versa, and which drives a motor with said variable-frequency AC power;
a power storage device, provided between said PWM converter and said PWM inverter, that can store electric power in an amount capable of driving said motor; and
a PWM converter control circuit which operates said PWM converter under PWM control, and wherein:
when the an output voltage of said PWM converter drops to or below the charge level, said PWM converter control circuit operates said PWM converter under PWM control such that said power storage device is charged until the voltage of said power storage device reaches the charge level, while not allowing an input current or input power of said PWM converter to exceed a predetermined value; and
when the voltage of said power storage device increases to or above a regeneration level by recovering a regenerative power occurring in said motor during the deceleration control period of said motor, the regenerative power flows back to the power supply until the voltage of said power storage device drops to the regeneration level, while not allowing the regenerative power to exceed a predetermined value.

6. A motor driving apparatus comprising:
a PWM converter which, under PWM control, converts AC power supplied from a power source into DC power and vice versa;
a PWM inverter which converts the DC power output from said PWM converter into variable-frequency AC power and vice versa, and which drives a motor with said variable-frequency AC power;
a power storage device, provided between said PWM converter and said PWM inverter, that can store electric power in an amount capable of driving said motor; and
a PWM converter control circuit which operates said PWM converter under PWM control, and wherein:
said PWM converter control circuit controls to limit an input current or input power of said PWM converter within a predetermined level range and said PWM converter control circuit performs PWM control by setting a control target value of an output voltage of said PWM converter to a second value, and then, when the voltage of said power storage device drops to a first value which is lower than the second value, said PWM converter control circuit performs PWM control by changing the control target value of the output voltage of said PWM converter from the second value to the first value such that a regenerative power occurring in said motor does not pass through to said power source; and
after the control target value of the output voltage of said PWM converter is changed from the second value to the first value, when the voltage of said power storage device increases to the second value by recovering a regenerative power occurring in said motor by said power storage device, said PWM converter control circuit performs PWM control by changing the control target value of the output voltage of said PWM converter from the first value to the second value.

7. A motor driving apparatus comprising:
a PWM converter which, under PWM control, converts AC power supplied from a power source into DC power and vice versa;
a PWM inverter which converts the DC power output from said PWM converter into variable-frequency AC power and vice versa, and which drives a motor with said variable-frequency AC power;
a power storage device, provided between said PWM converter and said PWM inverter, that can store electric power in an amount capable of driving said motor; and
a PWM converter control circuit which operates said PWM converter under PWM control, and wherein:
said PWM converter control circuit controls to limit an input current or input power of said PWM converter to a predetermined level and controls an output voltage of said PWM converter, in a first state;
when the voltage of said power storage device drops to a second value which is lower than the first value, a transition is made from the first state to a second state in which said PWM converter control circuit performs PWM control such that a current is supplied to the power storage device by way of the predetermined input current or input power;

in the second state, when the voltage of said power storage device increases to the first value, a transition is made from the second state to the first state;

in the second state, when the voltage of said power storage device drops to a third value which is lower than the second value, a transition is made from the second state to a third state in which said PWM converter control circuit controls to limit an input current or input power of said PWM converter to a predetermined level and controls an output voltage of said PWM converter by setting a control target value of an output voltage of said PWM converter to the third value;

in the third state, when the voltage of said power storage device exceed a fourth value which is larger than the third value and is lower than the second value, a transition is made from the third state to a fourth state in which the regenerative power occurring in said motor is recovered by said power storage device by turning off the PWM control; and in the fourth state, a transition is made from the fourth state to the first state when the voltage of said power storage device exceed the first value, and, in the fourth state, a transition is made from the fourth state to the third state when the voltage of said power storage device drops below the third value.

8. A motor driving apparatus as claimed in any one of claims 1 to 7, further comprising resistive discharge unit, which resistively discharges a portion of the power stored in said power storage device when the output voltage of said PWM converter has exceeded a predetermined value during the deceleration period of said motor.

* * * * *